US012642629B2

(12) United States Patent
Lee et al.

(10) Patent No.: US 12,642,629 B2
(45) Date of Patent: Jun. 2, 2026

(54) ALIGNMENT STATE INDICATING APPARATUS AND METHOD

(71) Applicant: MEDIT CORP., Seoul (KR)

(72) Inventors: Soo Bok Lee, Seoul (KR); Sung Bin Im, Seoul (KR)

(73) Assignee: MEDIT CORP., Seoul (KR)

( * ) Notice: Subject to any disclaimer, the term of this patent is extended or adjusted under 35 U.S.C. 154(b) by 588 days.

(21) Appl. No.: 17/969,766

(22) Filed: Oct. 20, 2022

(65) Prior Publication Data

US 2023/0045331 A1       Feb. 9, 2023

Related U.S. Application Data

(63) Continuation of application No. PCT/KR2021/004993, filed on Apr. 21, 2021.

(30) Foreign Application Priority Data

Apr. 21, 2020   (KR) ........................ 10-2020-0048207
Apr. 21, 2021   (KR) ........................ 10-2021-0051600

(51) Int. Cl.
*A61C 9/00*          (2006.01)
*A61C 1/00*          (2006.01)
*G08B 6/00*          (2006.01)

(52) U.S. Cl.
CPC ............ *A61C 9/006* (2013.01); *A61C 1/0015* (2013.01); *G08B 6/00* (2013.01)

(58) Field of Classification Search
CPC .......... A61C 9/006; A61C 1/0015; G08B 6/00
See application file for complete search history.

(56) References Cited

U.S. PATENT DOCUMENTS

2011/0287387 A1*  11/2011  Chen ...................... G03B 15/14
                                                               433/215
2015/0221084 A1    8/2015  Adamson
                                 (Continued)

FOREIGN PATENT DOCUMENTS

KR          10-1176770 B1      8/2012
KR     10-2016-0149301 A      12/2016
                       (Continued)

OTHER PUBLICATIONS

Final Office Action mailed Jul. 25, 2023 from the Korean Intellectual Property Office for Korean Application No. 10-2021-0051600.
                       (Continued)

*Primary Examiner* — Nicholas D Lucchesi

(57)                    ABSTRACT

In an alignment state indicating apparatus and method according to the present invention, scanning is performed by a scanner, raw data is formed through light incident into the scanner, 3D data is formed through the raw data, and alignment is performed. When it is determined that such an alignment process of 3D data is not performed normally, the alignment state indicating apparatus and method according to the present invention provide visual feedback to a user on an alignment error in the form of a specific pattern, thereby allowing the user to quickly recognize whether to perform the alignment. Accordingly, the alignment state indicating apparatus and method have the advantage of improving the reliability of scanning by allowing the user to scan an object closely.

17 Claims, 9 Drawing Sheets

(56) References Cited

U.S. PATENT DOCUMENTS

| | | | |
|---|---|---|---|
| 2016/0014396 A1 | 1/2016 | Glinec et al. | |
| 2017/0215698 A1 | 8/2017 | Rynderson | |
| 2018/0068455 A1 | 3/2018 | Lal et al. | |
| 2018/0249913 A1 | 9/2018 | Seibel et al. | |
| 2019/0046302 A1* | 2/2019 | Li | A61B 5/682 |
| 2019/0254783 A1* | 8/2019 | Moon | A61B 1/00045 |
| 2020/0205942 A1* | 7/2020 | Pesach | G06V 20/653 |
| 2021/0186667 A1* | 6/2021 | Abu-Tarif | A61B 1/00096 |

FOREIGN PATENT DOCUMENTS

| | | | |
|---|---|---|---|
| KR | 10-2017-0113412 A | 10/2017 | |
| KR | 10-2018-0126166 A | 11/2018 | |
| KR | 10-1974719 B1 | 5/2019 | |
| KR | 10-1977181 B1 | 5/2019 | |

OTHER PUBLICATIONS

Notice of Allowance mailed Dec. 13, 2023 from the Korean Intellectual Property Office for Korean Application No. 10-2021-0051600.
Non-final Office Action mailed Dec. 19, 2022 from the Korean Intellectual Property Office for Korean Application No. 10-2021-0051600.
International Search Report mailed Aug. 4, 2021 for International Application No. PCT/KR2021/004993 and its English translation.

* cited by examiner

ALIGNMENT STATE INDICATING APPARATUS AND METHOD

CROSS-REFERENCE TO RELATED APPLICATIONS

This application is a continuation application of International Application No. PCT/KR2021/004993, filed Apr. 21, 2021, which claims the benefit of Korean Patent Application Nos. 10-2020-0048207, filed Apr. 21, 2020; and 10-2021-0051600, filed Apr. 21, 2021, in the Korean Intellectual Property Office, the disclosures of which are incorporated herein in their entirety by reference.

TECHNICAL FIELD

The present disclosure relates to an alignment state indicating apparatus and a method thereof.

BACKGROUND ART

While three-dimensional (3D) printing technology that implements a file designed as digital data has already been spotlighted, a 3D scanning technology that converts a real existing object into digital data has also been continuously developed. The 3D scanning technology plays a key role in a CAD/CAM system, and in particular, has an increasing utilization for prosthesis production and cure to meet a patient's oral structure by scanning the patient's oral cavity (which is used so as to include teeth, gums, and jawbones).

Meanwhile, while a user scans a patient's oral cavity by using a 3D oral scanner, it is required for the user to repeatedly check whether 3D data is normally formed as viewing a screen of a display connected to the oral scanner. In this case, the user of the oral scanner proceeds with the scanning in a manner that the user is generally focused on the patient's oral cavity, that is, a portion being scanned, and checks the display screen occasionally by turning the user's head. If the user proceeds with the scanning in such a manner, user's fatigue increases rapidly, and thus user's concentration is dispersed with respect to the patient's oral cavity. This may cause reduction of data accuracy in obtaining the patient's data.

DISCLOSURE

Technical Problem

In order to solve the above problem, the present disclosure provides an alignment state indicating apparatus which enables a user to perceive an alignment error quickly and intuitively.

Further, the present disclosure provides an alignment state indicating method which enables a user who uses a scanner to intuitively perceive a state where connection and alignment are not normally performed (alignment error) between 3D data.

The technical problems of the present disclosure are not limited to the above-described technical problems, and other unmentioned technical problems may be clearly understood by those skilled in the art from the following descriptions.

Technical Solution

In order to solve the above object, the present disclosure provides an alignment state indicating apparatus, which includes: a case having an opening formed thereon and configured to be open so that an object in the form of light enters into the case; a light radiation unit disposed inside the case and configured to emit light in a first form having a predetermined rule through the opening; an imaging unit formed on one side of the light radiation unit and configured to obtain raw data by receiving incident light through the opening of the case; a controller configured to determine whether an alignment error occurs by performing data alignment between 3D data generated through imaging of the imaging unit, wherein the controller is configured to perform visual feedback of an alignment state by controlling the light emitted from the light radiation unit to be changed to a second form that is different from the first form when the alignment error occurs, and an alignment state indicating method, being indicated by the apparatus.

Specifically, in order to solve the existing drawback in that it is required to continuously check a display screen so as to perceive an alignment error, the present disclosure provides an alignment state indicating apparatus, in which if the alignment error occurs, a specific pattern or the like is radiated onto an oral cavity, and thus a user can intuitively perceive the alignment error, and an alignment state indicating method, being indicated by the apparatus.

Advantageous Effects

According to the present disclosure, data blank can be minimized by a user to additionally capture an image of an adjacent part of a part in which light in a second form that is different from light in a first form is displayed, and as a result, a precise 3D model can be obtained.

Further, since light in a second form is intuitively displayed on an object in a situation where a user continuously keeps an eye on a patient's oral cavity to obtain scan data, a scanner user's quick response becomes possible.

Further, light in a second form and an actuator may operate together, and in this case, a user can effectively receive alignment error state information through two or more visual and tactile senses.

DESCRIPTION OF DRAWINGS

FIG. 2 is a schematic conceptual view illustrating the configuration of an alignment state indicating apparatus according to an embodiment of the present disclosure.

FIG. 3A is a conceptual view illustrating a first pattern in a first form, being radiated in an alignment state indicating apparatus and method according to the present disclosure.

FIG. 3B is a conceptual view illustrating a second pattern in a second form, being radiated in an alignment state indicating apparatus and method according to the present disclosure.

FIG. 4 is a view explaining a handle that is an additional constituent element of an alignment state indicating apparatus according to the present disclosure.

FIG. 9 is a diagram explaining in detail another method for indicating an alignment state.

---

Figure 1:
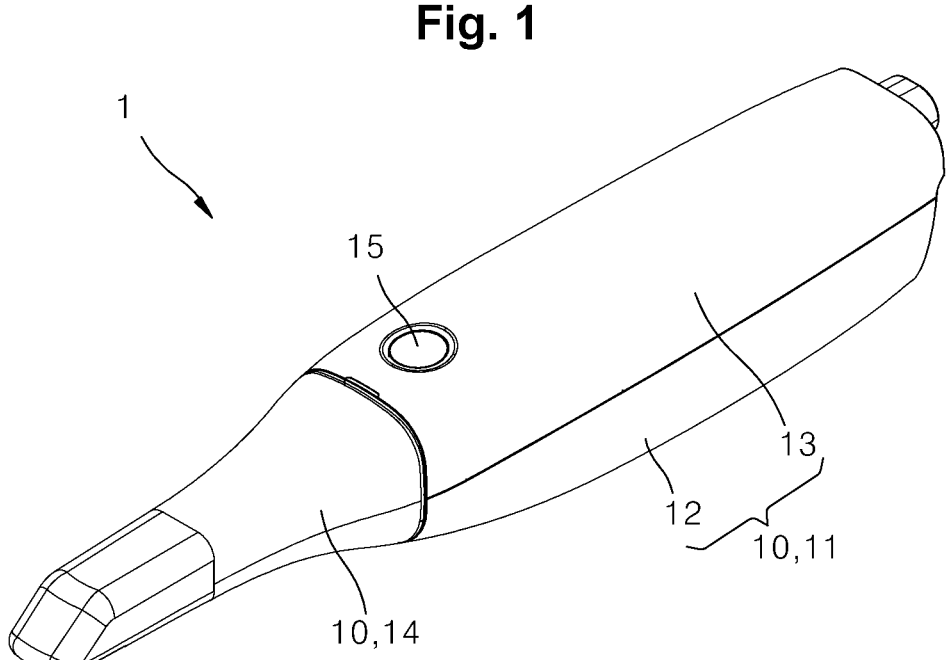
FIG. 1 is a perspective view illustrating a scanner of an alignment state indicating apparatus according to an embodiment of the present disclosure.

| [Explanation of symbols] | |
|---|---|
| 1: scanner | 10: case |
| 11: body case | 12: lower case |
| 13: upper case | 14: tip case |
| 15: button | 20: imaging unit |
| 21: camera | 40: optical element |
| 22: imaging sensor | 60: actuator |
| 50: light radiation unit | 71: form controller |
| 70: controller | 80: handle |
| 72: vibration controller | A: alignment state |
| 2: display unit | indicating apparatus |
| P1: first pattern | P2: second pattern |
| S1: light radiating step | S2: scanning step |
| S3: raw data obtaining step | S4: 3D data conversion step |
| S5: alignment step | S6: alignment checking step |
| S7: feedback step | S8: repetition step |
| T: object | SC1: first scan area |
| SC2: second scan area | B: data blank |

---

MODE FOR INVENTION

Hereinafter, some embodiments of the present disclosure will be described in detail with reference to the exemplary drawings. In adding reference numerals to constituent elements in the drawings, it is to be noted that the same constituent elements have the same reference numerals as much as possible even if they are represented in different drawings. Further, in explaining embodiments of the present disclosure, the detailed explanation of related known configurations or functions will be omitted if it is determined that the detailed explanation interferes with understanding of the embodiments of the present disclosure.

The terms, such as "first, second, A, B, (a), and (b)", may be used to describe constituent elements of embodiments of the present disclosure. The terms are only for the purpose of discriminating one constituent element from another constituent element, but the nature, the turn, or the order of the corresponding constituent elements is not limited by the terms. Further, unless otherwise defined, all terms (including technical and scientific terms) used herein have the same meanings as those commonly understood by those ordinary skilled in the art to which the present disclosure belongs. The terms that are defined in a generally used dictionary should be interpreted as meanings that match with the meanings of the terms from the context of the related technology, and they are not interpreted as an ideal or excessively formal meaning unless clearly defined in the present disclosure.

Figure 2:
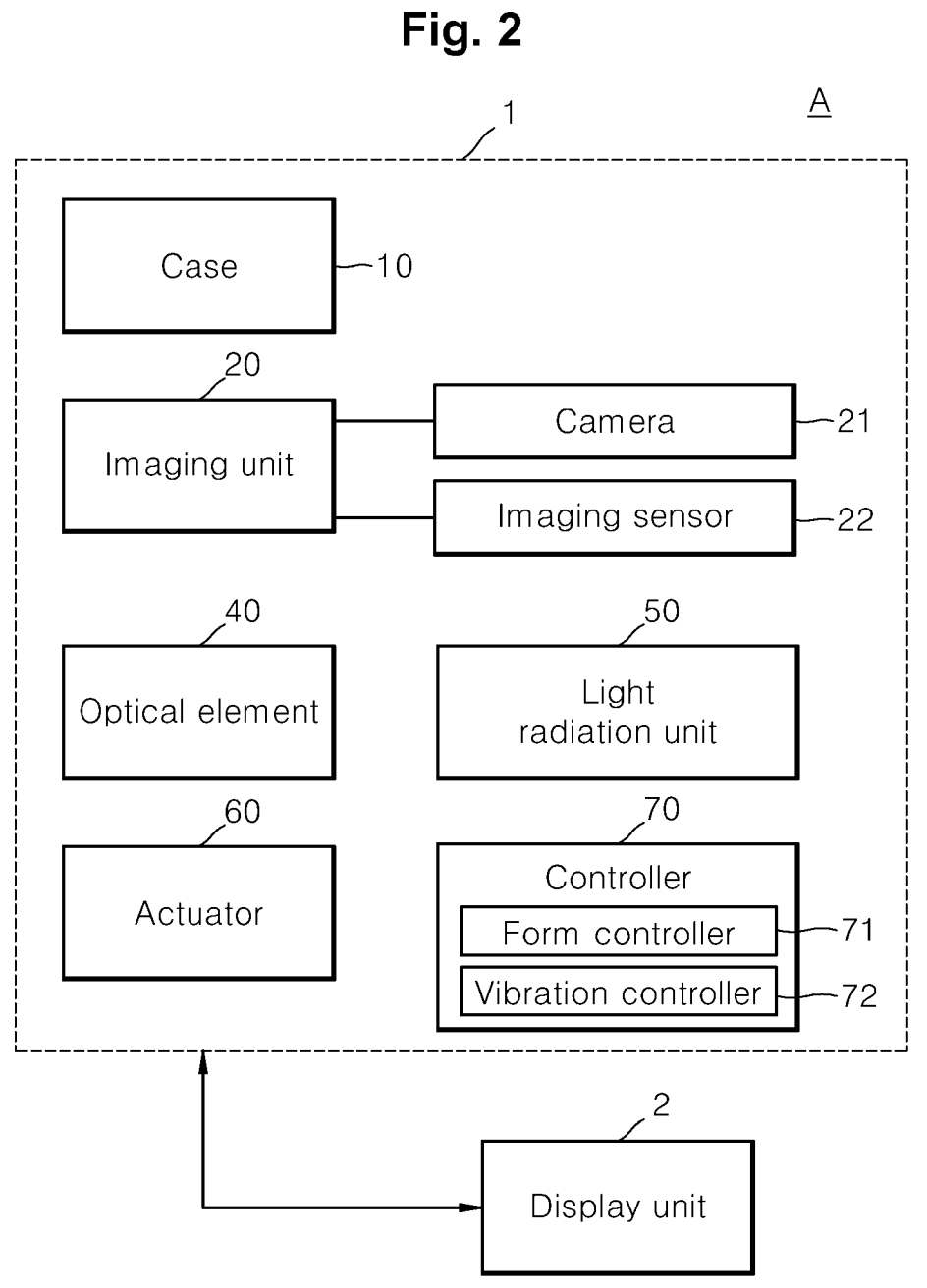

FIG. 1 is a perspective view illustrating a scanner of an alignment state indicating apparatus according to an embodiment of the present disclosure. FIG. 2 is a schematic conceptual view illustrating the configuration of an alignment state indicating apparatus according to an embodiment of the present disclosure.

Referring to FIGS. 1 and 2, an alignment state indicating apparatus A according to the present disclosure may include a scanner 1 including a case 10 having an opening formed thereon and configured to be open so that an object in the form of light enters into the case, a light radiation unit 50 disposed inside the case and configured to emit light in a first form having a predetermined rule through the opening of the case, and an imaging unit 20 disposed inside the case, formed on one side of the light radiation unit 50, and configured to obtain raw data by receiving incident light which is incident through the opening of the case 10. Exemplarily, the object may be an actual oral cavity of a patient. However, the object is not limited only to the actual oral cavity of the patient, and may include various objects including a gypsum model obtained by performing dental impression of the patient's oral cavity.

The case 10 may be an exterior of the scanner 1 in the alignment state indicating apparatus A, which obtains information including images of the patient's oral cavity through a scanning process, and performs connection and alignment of the obtained images by forming the corresponding images in 3D, and the case 10 may serve to protect the constituent elements of the scanner from an external environment by disposing the constituent elements inside the case 10.

Meanwhile, inside the case, the light radiation unit 50 that is disposed so as to emit the light through the opening may be formed. The light radiation unit 50 may generate the light through the light source unit, and in this case, the generated light may be variously formed in accordance with user's needs. Exemplarily, the light radiation unit 50 may generate the light having a wavelength in a visible light region through the light source unit. Further, the light radiation unit 50 may radiate a structured light having a specific pattern onto the object in order to convert raw data obtained by the imaging unit 20 into 3D data having a volume. The related contents will be described later.

Meanwhile, the raw data is a 2D or 3D image data that is obtained to generate the 3D data of the object, and may be data (exemplarily, 2D image data) obtained from at least one camera included in the scanner when the object is scanned by using the scanner 1.

The light radiation unit 50 may generate a light in a first form having a predetermined rule. In this case, in order to generate the light having the predetermined rule, the light radiation unit 50 may include a digital micro-mirror device (DMD) chip together with the light source unit (not illustrated) that generates the light. That is, the light radiation unit 50 may be a digital light processing (DLP) type optical projector that radiates the light emitted from the light source unit onto the object (patient's oral cavity) through the DMD chip. In this case, in the DMD chip, a plurality of micro-mirrors are disposed in the form of an array on a CMOS substrate, and the angle of the micro-mirrors may be adjusted and changed to have a slope of about 10 to 12 degrees. In accordance with the angle change of the micro-mirrors that constitute the DMD chip, the light that reaches the micro-mirrors at a specific location may be radiated onto the object, whereas the light that reaches the micro-mirrors having other angles may not be radiated onto the object. Accordingly, the light radiation unit 50 may produce the light in a desired form by forming light on/off in accordance with the angle of the micro-mirrors. The DMD chip may be formed in a single plate type or in a 3-plate type.

Meanwhile, the term "predetermined rule" in the description may mean a specific arrangement, or may mean a phenomenon in which a specific arrangement is continuously varying. This means that the light having the predetermined rule may have one static pattern or a plurality of varying patterns.

Meanwhile, the light radiation unit 50 may emit and radiate lights in different forms onto the object in accordance with the state of the alignment state indicating apparatus according to the present disclosure. That is, if an error (alignment error) occurs in an alignment performing process when the alignment state indicating apparatus performs data arrangement (alignment) between 3D data generated by imaging of the imaging unit 20, the light emitted from the light radiation unit 50 may be changed to light in a second form that is different from the light in the first form as described above. In this case, the form change of the light being emitted from the light radiation unit 50 may be a pattern change of the light or the color change of the light.

Exemplarily, the light radiation unit 50 may generate a first pattern P1 and a second pattern P2, and such patterns are illuminated on the object that is the target of scanning, so that visual feedback of the alignment state can be provided. A user can easily and visually perceive whether an alignment error occurs in accordance with the change of the illuminated pattern, and can obtain a reliable 3D model by performing an additional scanning with respect to the part where the alignment error has occurred.

Hereinafter, the above-described pattern change will be described in more detail.

Figure 3A:
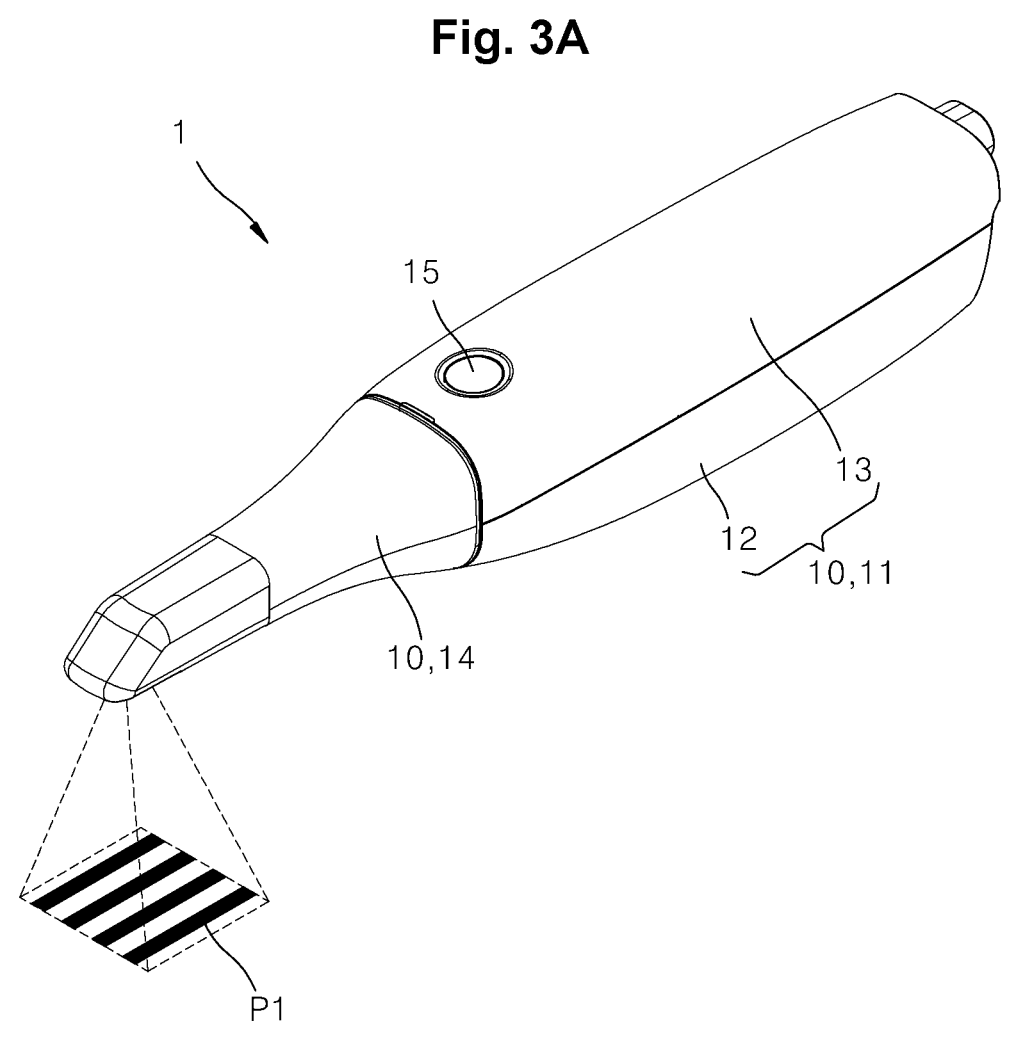
Figure 3B:
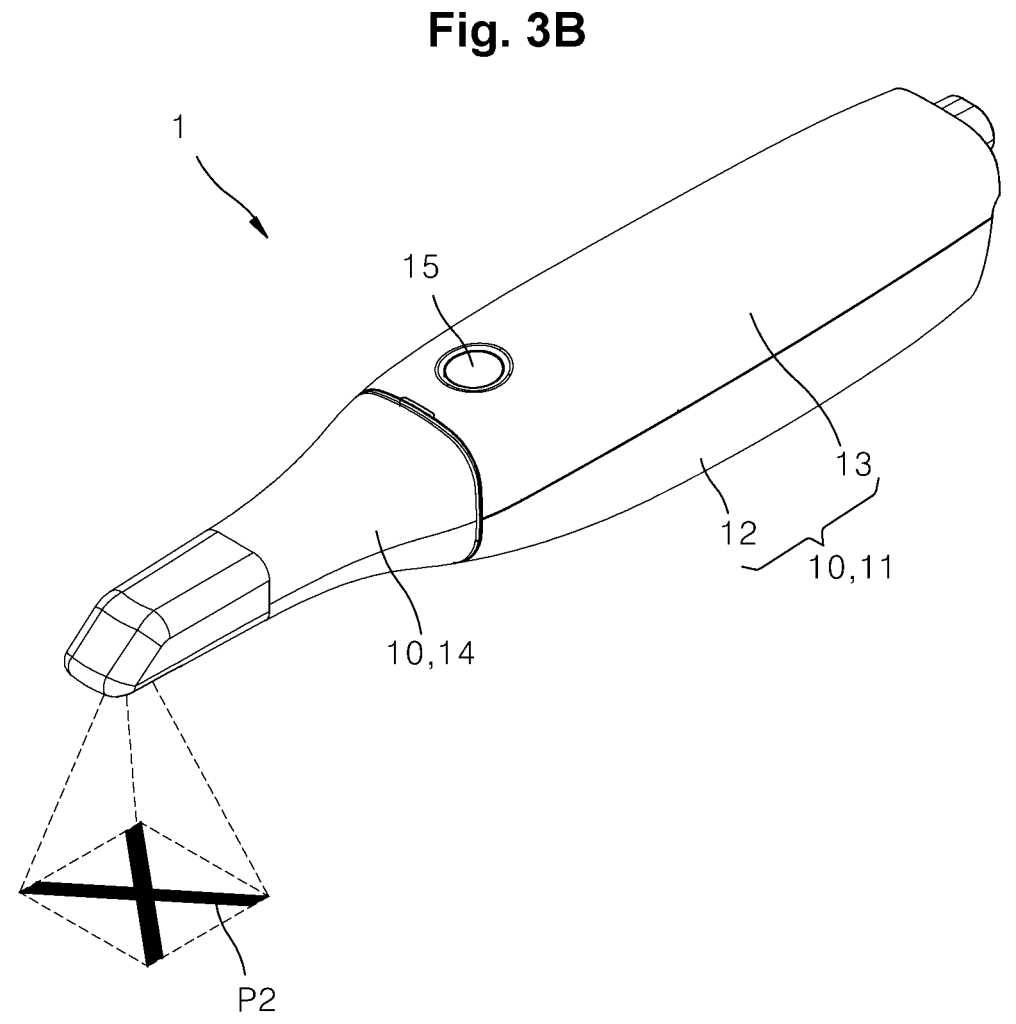

FIG. 3A is a conceptual view illustrating a first pattern P1 in a first form, being radiated in an alignment state indicating apparatus and method according to the present disclosure, and FIG. 3B is a conceptual view illustrating a second pattern P2 in a second form, being radiated in an alignment state indicating apparatus and method according to the present disclosure.

Referring to FIG. 3A, when the scanner 1 constituting the alignment state indicating apparatus A according to the present disclosure performs the scanning process, the light radiation unit 50 may emit the light in the form of the first pattern P1 having a predetermined rule in order to radiate the light onto the oral cavity that is the object. In this case, the first pattern P1 of the light may be variously formed, and the first pattern P1 may be in the form of a structured light having a stripe form for converting the raw data obtained by the above-described imaging unit 20 into 3D data. Meanwhile, the raw data is converted into the 3D data, and the alignment between the 3D data is performed to finally form one 3D model. In this case, in order to perform the alignment between the 3D data, data overlapping should be performed between the 3D data.

Meanwhile, if an amount of data enough to perform the data overlapping is not accumulated, the alignment process may not be normally performed, and in a part where an enough amount of data is not accumulated, connection between data may be lost to cause data blank to occur. As illustrated in FIG. 3B, in case that the alignment process is not normally performed, and thus an error (i.e., alignment error) occurs, the light radiation unit 50 having radiated the first pattern P1 may change the light so as to radiate the second pattern P2 that is different from the first pattern P1 although having the predetermined rule. In this case, the second pattern P2 may be in the form of an alphabet "X", and is visually displayed on the object of the scanning. In this case, since a user who is performing the scanning process through the alignment state indicating apparatus according to the present disclosure continuously keeps on eye on the object of scanning, the user can promptly perceive the fact that the error has occurred in the alignment process by visually checking the change of the pattern (e.g., change from the first pattern P1 to the second pattern P2) being radiated from the light radiation unit 50 to the object, and can obtain the data having high reliability by additionally carefully scanning the point where the corresponding alignment error has occurred.

As described above, although it is described that the first pattern P1 is in the form of a static pattern, it may be selectively in the form of a varying pattern. For example, when the scanner 1 constituting the alignment state indicating apparatus A according to the present disclosure performs the scanning process, the first pattern P1 may correspond to sequential radiation of two or more detailed patterns. For example, a varying pattern may be repeatedly radiated in a manner that the (1-1)-th pattern of a stripe pattern is first radiated, the (1-2)-th pattern having a narrower stripe width than the stripe width of the (1-1)-th pattern is radiated after a predetermined time, the (1-3)-th pattern having a narrower stripe width than the stripe width of the (1-2)-th pattern is radiated after the predetermined time again, and the radiation of the (1-1)-th pattern is returned over again.

As described above, if the alignment process is not normally performed and thus an error occurs during performing of the scanning process while the varying first pattern P1 is radiated, the pattern that is radiated from the light radiation unit 50 may be changed from the first pattern P1 to the second pattern P2, and in this case, the second pattern P2 may be a single static pattern unlike the varying first pattern P1. For example, as illustrated in FIG. 3B, the second pattern P2 may be continuously radiated onto the object without being changed to the other pattern, and the user can perceive the fact that the error has occurred in the alignment process without missing the second pattern P2 being displayed. Meanwhile, as described above, the change from the first pattern P1 to the second pattern P2 or the change from the varying pattern to the static pattern may be formed through the angle adjustment of the micro-mirror array constituting the DMD chip of the light radiation unit 50.

Meanwhile, the light radiation unit 50 may not only radiate a pattern of a specific form but also emit light of a specific color. For example, in case that the alignment process is normally performed, the light radiation unit 50 may emit light including a first color having a first wavelength range. Further, when the alignment error occurs, the light radiation unit 50 may emit light including a second color which is different from the first color and has a second wavelength range. For example, in case that the alignment process is normally performed, the light radiation unit 50 may radiate a blue light, whereas in case that the alignment process is not normally performed, the light radiation unit 50 may radiate a red light. However, this is merely exemplary, and any colors can be used as long as the first color and the second color are used as colors that can be distinguished from each other by the user. Such a color change may appear by adjusting the wavelength of the light emitted from the light source unit of the light radiation unit 50. Further, in case that the light source unit of the light radiation unit 50 includes a plurality of light source elements having different wavelength ranges, the light radiation unit 50 can radiate different colors by on/off combination of the plurality of light source elements.

Further, in case that the alignment process is normally performed, the light having the first color together with the first pattern may be radiated, whereas in case that the alignment process is not normally performed and thus the alignment error occurs, the light having the second color together with the second pattern may be radiated. For example, in case that the alignment process is normally performed, a blue light together with a stripe patter may be radiated, whereas in case that the alignment process is not normally performed, a red light together with an X-shaped pattern may be radiated. Since the pattern change and the color change appear together, the user can easily perceive whether the alignment error has occurred.

As another embodiment, in case that the alignment process is normally performed, the light radiation unit may radiate variable colors or patterns onto the patient's oral cavity in the order of a red light, a green light, a blue light, a blue light having the (1-1)-th pattern, a blue light having the (1-2)-th pattern, and a blue light having the (1-3)-th pattern. Accordingly, the obtained raw data may include first raw data obtained by radiating the red light, second raw data obtained by radiating the green light, third raw data obtained by radiating the blue light, fourth raw data obtained by radiating the blue light having the (1-1)-th pattern, fifth raw data obtained by radiating the blue light having the (1-2)-th pattern, and sixth raw data obtained by radiating the blue light having the (1-3)-th pattern. Exemplarily, in order to generate one 3D data, a plurality of raw data are required. Exemplarily, in order to generate one 3D data, 14 raw data may be obtained. That is, 14 raw data may be obtained as one set to generate one 3D data.

If the alignment error occurs during performing of the alignment process, the light can be successively radiated without blinking by a light source (e.g., light source having a red light or a green light) having a different color from the blue light. As another embodiment, together with the second pattern that is the static pattern, the light having a different color that is not the blue light can be successively radiated. Accordingly, in case that the light is successively radiated without blinking, the user can easily perceive that the alignment error has occurred.

Further, the at least one imaging unit 20 may be formed inside the case 10, and may be formed adjacent to one side of the light radiation unit 50 as described above. The imaging unit 20 may include a camera for obtaining the light accommodated through the opening formed at one end of the case 10. The camera constituting the imaging unit 20 may be a single camera or two or more multi-cameras. Exemplarily, the imaging unit 20 may be configured to obtain more precise data through two or more cameras like human eyes.

As described above, the raw data may be obtained through imaging of the imaging unit 20, and the controller 70 may convert the raw data into 3D data and may perform connection and arrangement (alignment) between 3D data. The alignment process may be performed in various ways, and preferably, it may be performed by using an iterative closest point (ICP) method.

Further, the alignment state indicating apparatus A according to the present disclosure may include an actuator 60 that operates to additionally vibrate in case that an error occurs in the alignment performing process. Since the actuator 60 tactilely performs an additional feedback of whether the alignment error has occurred to the user together with the light radiation in the form of a pattern/color through the light radiation unit 50, the user can receive the feedback of the alignment error through two or more senses.

Further, the alignment state indicating apparatus A may further include a display unit 2 connected in telecommunication through the other end of the case 10 and configured to visually display an error occurrence part in case that the error occurs in the alignment performing process. The display unit 2 may visually display a user interface (UI), and show an object in the form of a 3D model. Further, the alignment error occurrence part may be displayed on the 3D model.

Meanwhile, the above-described scanning process, 3D data conversion process, alignment process, control of the light radiation unit 50, and control of the actuator 60 may be performed through the controller 70. As illustrated in FIG. 2, the controller 70 may be formed inside the scanner 1 constituting the alignment state indicating apparatus A according to the present disclosure. However, this is merely exemplary, and the controller 70 may be formed in the form of a microprocessor in another electronic device like a computing device, such as a laptop computer, a smart phone, a desk-top computer, a PDA, or a tablet PC, which is formed spaced apart from the scanner 1.

In particular, the controller 70 may control the wavelength range of the light generated by the light source unit, or may adjust the angle of the plurality of micro-mirrors constituting the DMD chip. Exemplarily, the controller 70 may include a form controller 71 configured to control the form of the light emitted from the light radiation unit 50. In case that the alignment between 3D data is normally performed when the user performs the scanning process by using the scanner 1, the form controller 71 may control the light radiation unit 50 so that the light radiated from the light radiation unit 50 is formed in a first form (first pattern, first color, or combination of the first pattern and the first color). In case that the alignment process between the 3D data is not normally performed and thus the alignment error occurs, the form controller 71 may control the light radiation unit 50 so that the light radiated from the light radiation unit 50 is formed in a second form (second pattern, second color, or combination of the second pattern and the second color).

Meanwhile, the controller 70 may selectively include a vibration controller 72 configured to control vibrations of the actuator 60. Under the control of the form controller 71, the vibration controller 72 may control the actuator 60 so that the actuator 60 vibrates together when the light radiation unit 50 radiates the light in a second form and/or in a second color. In this case, the vibration of the actuator 60 may be intermittent or continuous, and the vibration controller 72 may control the actuator 60 to vibrate as long as a predetermined time interval.

Meanwhile, in the scanner 1 constituting the alignment state indicating apparatus A according to the present disclosure, the case 10 may be in a handheld form including a body case 11 that is a part gripped by the user, and a tip case 14 having an opening formed at one end thereof so that the object in the form of light enters into the scanner. By using the handheld type scanner 1, the user can perform the scanning with free angles and distances with respect to the object.

Further, inside one end of the tip case 14, an optical element 40 for transferring incident light which is incident into the scanner 1 to the imaging unit 20 may be formed. The optical element 40 may refract and reflect the light, and exemplarily, the optical element 40 may be a mirror or a prism. The light being transferred to the imaging unit 20 by the optical element 40 may be the light reflected from the object, and the light may be obtained as the light emitted from the light radiation unit 50 is reflected from the object.

Figure 4:
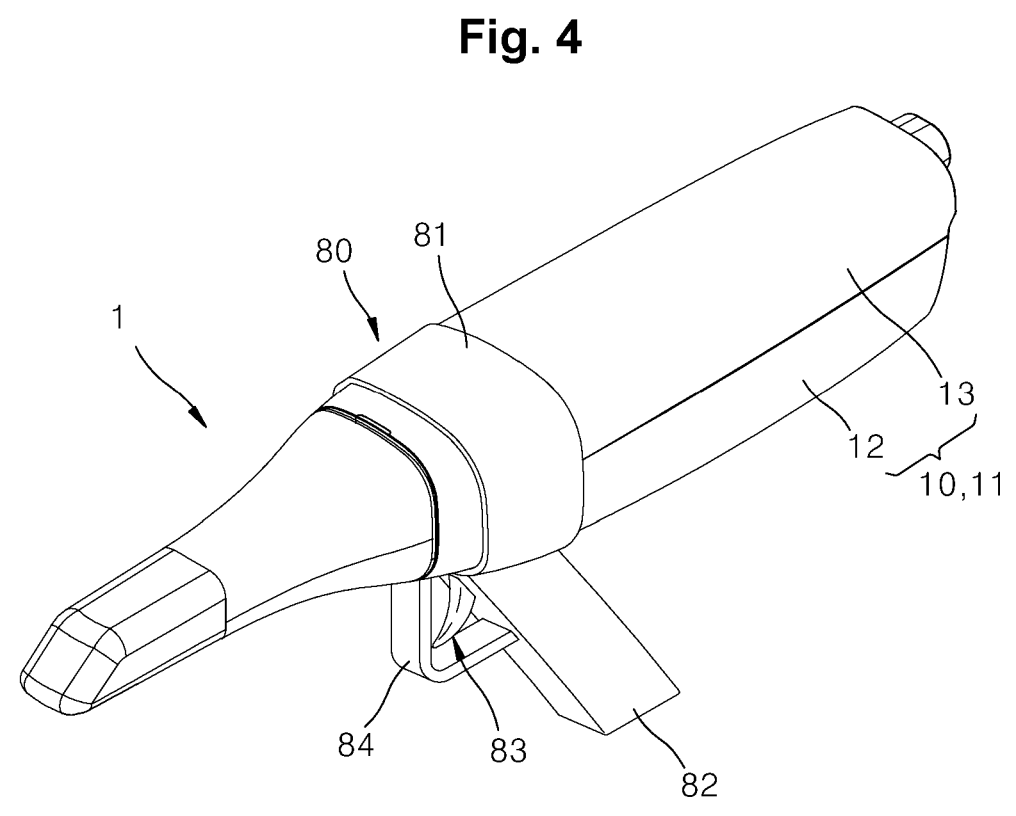

FIG. 4 is a view explaining a handle 80 that is an additional constituent element of an alignment state indicating apparatus A according to the present disclosure.

Referring to FIG. 4, the scanner 1 constituting the alignment state indicating apparatus A may be formed in a gun shape, which further includes a handle 80 combined and integrally formed with the outer surface of the case 10. In this case, the handle 80 may include a trigger 83 being pressed by at least one finger of the user and operating to turn on/off the scanning process. The trigger 83 is formed in a trigger shape, and if the trigger is pressed, the scanning process is performed, whereas if the pressing is stopped, the scanning process is also stopped. For example, if the user presses the outer surface of the trigger with the user's index finger, the scanning may be performed, whereas if the pressing is not performed (if the pressing is stopped), the scanning may also be stopped.

Meanwhile, the handle 80 may include a handle main body 81 that covers a part of an outer surface of the case 10, and a gripping part 82 formed to extend in one direction from the outer surface of the case 10 and formed so that an outer surface of the gripping part 82 is wrapped by other fingers of the user except the finger that presses the trigger 83. The outer surface of the gripping part 82 may be gripped around by other fingers that are not located on the trigger 83. For example, in case that the user operates the trigger 83 by using the index finger, the remaining fingers (thumb, middle finger, ring finger, and little finger) of the user may grip the outer surface of the gripping part 82. As described above, since the handle 80 including the trigger 83 and the gripping part 82 is additionally formed, the user can perform the scanning by pressing the trigger 83 while gripping the handle 80 without directly gripping the main body of the case 10 of the scanner 1, and thus the user can easily aim at the object, so that the precise scanning becomes possible.

Further, the handle 80 may additionally include a trigger protector 84 formed to be spaced apart from the outer surface of the trigger 83, and configured to connect the case 10 of the scanner 1 and the gripping part 82 with each other. Through an inner space formed between the trigger protector 84 and the trigger 83, at least one finger (e.g., index finger) of the user for pressing the trigger 83 as described above can be inserted and accommodated therein. In this case, the trigger 83 is determined to perform scanning or to stop the scanning only depending on whether the trigger 83 is pressed by the index finger of the user. Since the trigger protector 84 is formed, unnecessary scanning can be prevented from being performed through unintended pressing of the trigger 83. Meanwhile, the trigger protector 84 is formed to have a ring-shaped space in a vertical direction to a length direction of the case 10, and the user's finger can be easily accommodated therein.

Hereinafter, an alignment state indicating method according to the present disclosure will be described in detail.

Figure 5:
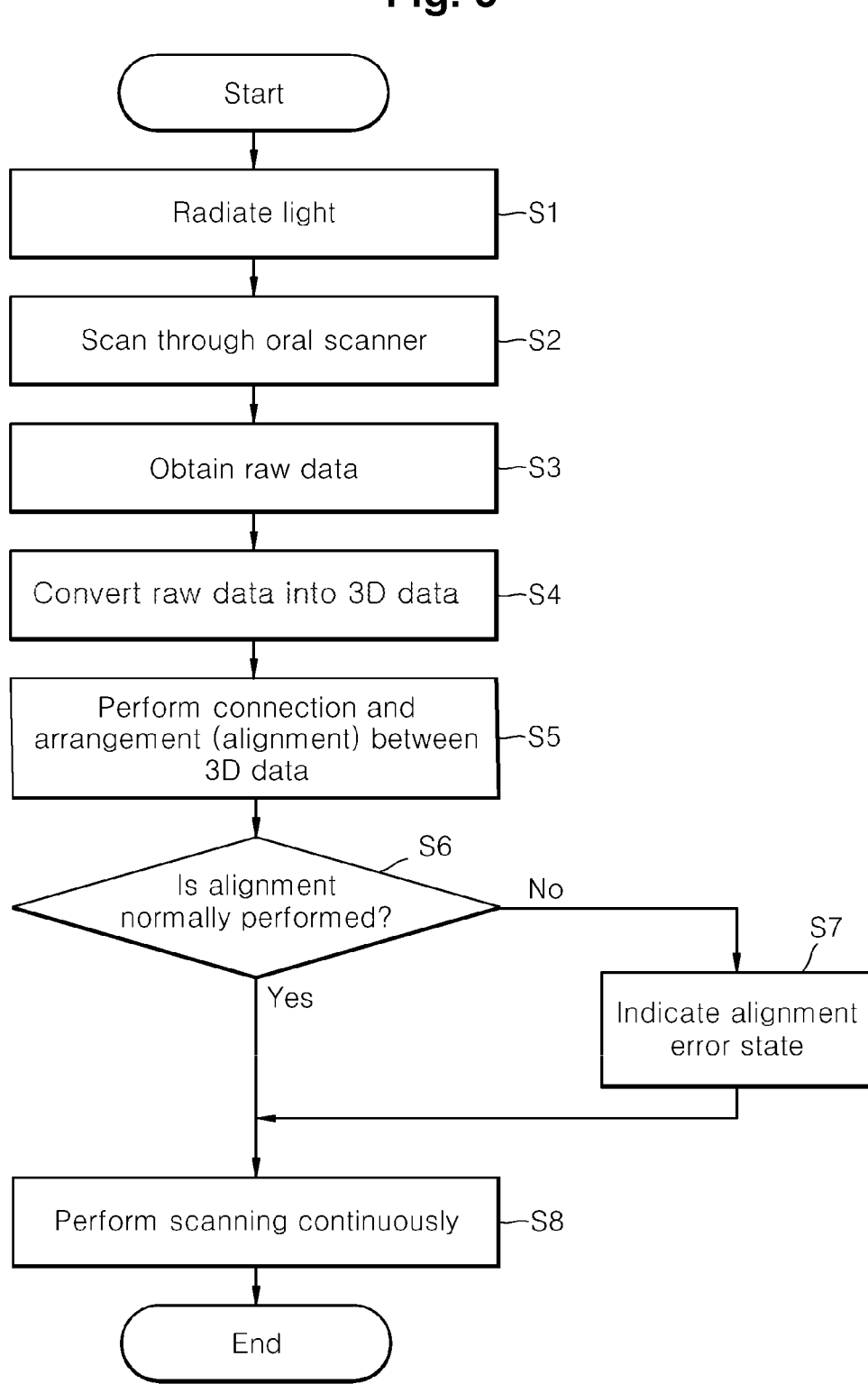
FIG. 5 is a flowchart of an alignment state indicating method according to the present disclosure.
Figure 6:
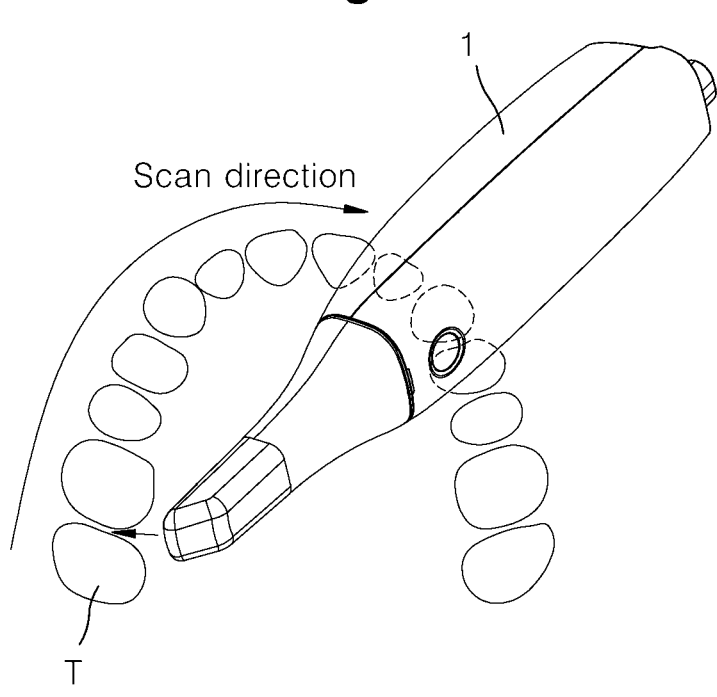
FIG. 6 is a conceptual view explaining a scanning process through a scanner in an alignment state indicating method according to the present disclosure.
Figure 7:
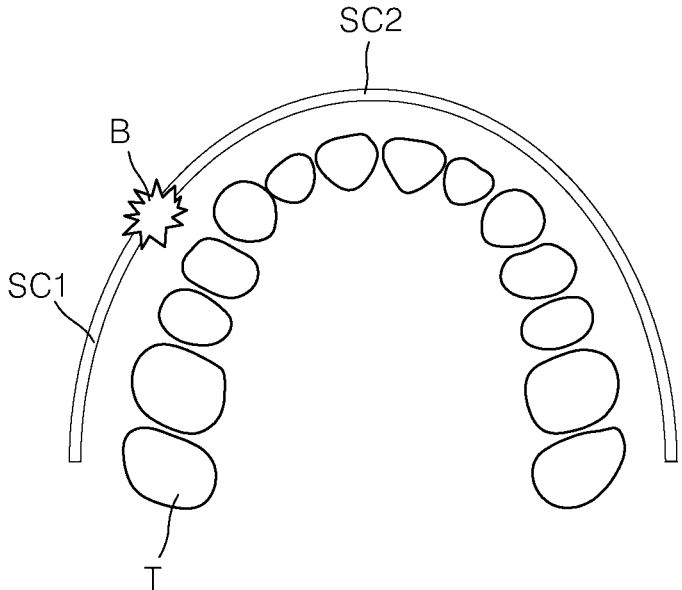
FIG. 7 is a conceptual view indicating a state where alignment is broken and data blank occurs in an alignment state indicating method according to the present disclosure.

FIG. 5 is a flowchart of an alignment state indicating method according to the present disclosure, FIG. 6 is a conceptual diagram explaining scanning through a scanner in an alignment state indicating method according to the present disclosure, and FIG. 7 is a conceptual diagram indicating a state where alignment is broken and data blank occurs in an alignment state indicating method according to the present disclosure.

FIG. 5 is a flowchart of an alignment state indicating method according to the present disclosure, FIG. 6 is for explaining a scanning process through a scanner in an alignment state indicating method according to the present disclosure, and FIG. 7 is a conceptual view indicating a state where alignment is broken and data blank occurs in an alignment state indicating method according to the present disclosure.

Referring to FIGS. 2 and 5 to 7, an alignment state indicating method according to the present disclosure may include: a light radiation step (S1) of emitting light in a first form having a specific shape by a light radiation unit 50 built in a scanner 1 configured to scan an object; a scanning step (S2) of scanning the object; a raw data obtaining step (S3) of obtaining raw data by an imaging unit 20 formed on an inside of the scanner 1 through incident light which is incident to an inside of the scanner 1 in the scanning step (S2); a 3D data conversion step (S4) of converting the raw data into 3D data; an alignment step (S5) of performing data connection and alignment between the 3D data generated in the 3D data conversion step; an alignment checking step (S6) of determining whether an alignment error occurs in an alignment process between the 3D data; and a feedback step (S7) of indicating an alignment error state by emitting light in a second form that is different from the light in the first form through the light radiation unit 50 when the alignment error occurs in the alignment checking step.

Hereinafter, the respective steps will be described in detail.

In the alignment state indicating method according to the present disclosure, in order to obtain a reliable 3D model through better illumination of an object T when the scanner 1 scans the object T in the scanning step (S2), the light radiation unit 50 built in the scanner 1 may radiate light toward the object T in the light radiation step (S1). More specifically, in the light radiation step (S1), the light radiation unit 50 built in the scanner 1 radiates the light toward the optical element 40, and the radiated light is refracted and reflected by the optical element 40, and reaches the surface of the object T. Thereafter, the light having reached the surface of the object T is reflected again, and is incident to an inside of the scanner 1 through the imaging unit 20 to be obtained as raw data. The raw data may be converted into the 3D data.

Meanwhile, the light being radiated in the light radiation step (S1) may have a first form that is a first pattern having a predetermined rule, a first color, or a combination of the first pattern and the first color, and the light form (pattern and color) is as described above in the alignment state indicating apparatus according to the present disclosure. That is, the light in the first form, which is emitted from the light radiation unit 50 in the light radiation step (S1), may be in the form of the first pattern having the predetermined rule, the first color, or the combination of the first pattern and the first color, and the light in the second form, which is emitted from the light radiation unit in a feedback step (S7) to be described later may be in the form of the second pattern, the second color, or the combination of the second pattern and the second color.

The scanning step (S2) may be a step of scanning the object T through the scanner 1. Referring to FIG. 6, a user may grip the handheld type scanner 1 with the user's hand, and may scan the object T to be scanned. Exemplarily, the user may continuously scan a tooth (i.e., object) formed in the patient's oral cavity from one direction to the other direction as a whole, and as needed, the user may additionally scan a part on which the scanning has been insufficiently performed.

Further, the raw data obtaining step (S3) may be a step in which the imaging unit 20 obtains the raw data through incident light which is incident into the scanner 1 in the above-described scanning step (S2). Meanwhile, the imaging unit 20 may include at least one camera 21 formed inside the body case 11 as described above. In the specification, "at least one camera 21" may be one single camera, or multiple cameras composed of two or more cameras.

Further, the imaging unit 20 may include an imaging sensor 22 connected in telecommunication with the camera. The imaging sensor 22 may serve to generate the raw data by analyzing incident light which is incident through the camera 21. Exemplarily, the raw data may mean planar 2D image data.

Further, the 3D data conversion step (S4) may be a step of converting the raw data obtained in the above-described raw data obtaining step (S3) into the 3D data. Exemplarily, in order to convert the raw data into the 3D data having a volume, the brightness value of each pixel of the raw data may be used in the 3D data conversion step (S4). The 3D data conversion step (S4) may be performed by the above-described controller 70.

Further, the alignment step (S5) may be a step of over-lapping and aligning the 3D data that is generated through conversion of the raw data so that overlapping parts of the 3D data are connected with each other.

Through the continuous imaging and data obtaining as described above, the upper jaw, lower jaw, and occlusion data of the patient can be obtained, and as a result, one 3D model is completed as the upper jaw, lower jaw, and occlusion data are connected and aligned with one another. Exemplarily, the 3D model may indicate information of the form, shape, and color of the patient's oral cavity. The alignment step (S5) may be performed by the above-described controller 70.

Further, the alignment checking step (S6) may be a step of identifying whether the overlapping parts of the 3D data exist and whether the data are connected and aligned with one another. If it is determined that the alignment failure occurs between the 3D data in the alignment step (S6), the controller 70 of the alignment state indicating apparatus A according to the present disclosure may perform a control so that the user can perceive the alignment failure.

The feedback step (S7) may be a step in which the scanner 1 indicates an error state if it is determined that the align-ment between the 3D data is not normally performed in the alignment checking step (S6). In this case, the feedback in the present disclosure may mean a step of performing a notification so that the user of the scanner 1 can perceive the alignment error state, and as an example, the user can perceive the alignment error state by the pattern radiation of the light radiation unit. The feedback step (S7) may be performed by the above-described controller 70 and the light radiation unit 50 that is controlled by the controller 70.

More specifically, the operation of the scanner 1 that indicates to notify the user of the alignment (more accu-rately, alignment error state where connection and alignment between the 3D data is not performed) in the above-described feedback step (S7) may exemplarily be an operation in which the light radiation unit 50 built in the case 11 of the scanner 1 radiates light having a predetermined rule. In this case, the light being radiated from the light radiation unit 50 may be the light in the second form which is formed differently from the light in the first form that is radiated in the light radiation step (S1) and is distinguished from the light in the first form. That is, in order to notify the user that the alignment is not performed normally in the alignment step (S5), i.e., in order to notify the user that the user does not carefully scan the patient's oral cavity in the scanning step (S2), the feedback step (S7) may enable the user to perceive the alignment error state by making the light that is radiated by the light radiation unit 50 have the form different from the form of the light that is radiated in the light radiation step (S1).

As a specific example, in general, if the scan and align-ment step is normally performed in FIG. 3A, the controller 70 controls the light radiation unit 50 to radiate the first pattern P1 that is a lattice or repeated pattern and forms 3D model data. Meanwhile, as compared with FIG. 3B, the X-shaped second pattern P2 appears in FIG. 3B. Accord-ingly, as compared with a case where the first pattern P1 is radiated, the user can easily perceive the second pattern P2 that the controller 70 controls the light radiation unit 50 to radiate when the alignment error occurs as the pattern different from the first pattern P1. However, the second pattern P2 should not necessarily have the X-shaped form, and any form which is different and is distinguished from the first pattern P1 and thus can be easily perceived by the user can be used.

When the user scans the object in the feedback step (S7), the user can easily perceive the second pattern P2 that is radiated toward the object T by the light radiation unit 50, and since the corresponding second pattern P2 appears, the user can visually identify the occurrence of the alignment failure. The user can minimize a data blank B by additionally capturing an image of an adjacent part of the part in which the second pattern P2 is displayed, and as a result, a precise 3D model can be obtained. Further, since the second pattern P2 is intuitively displayed on the object T in a situation where the user continuously keeps an eye on the object to obtain the raw data (ultimately, 3D model), the scanner user's quick response becomes possible.

More specifically, in the alignment state indicating method according to the present disclosure, the pattern shape (first pattern) of the light that is radiated toward the object by the light radiation unit 50 in the light radiation step (S1) may be a pattern in the form of a horizontal stripe, and the pattern shape (second pattern) of the light that is radiated toward the object by the light radiation unit 50 in the feedback step (S7) may be a pattern in the form of a vertical stripe. Alternatively, the pattern shape (first pattern) of the light that is radiated in the light radiation step (S1) may be a pattern in the form of a stripe, and the pattern shape (second pattern) of the light that is radiated toward the object in the feedback step (S7) may be a pattern in the form of an alphabet "X". However, this is merely exemplary, and any forms can be applied to the alignment state indicating method according to the present disclosure as long as the form of the light that is radiated in the light radiation step (S1) and the form of the light that is radiated in the feedback step S7 are different from each other enough to be distin-guished from each other. Such a form change of the light may appear by the angle adjustment (change) of a plurality of micro-mirrors through the digital micro-mirror device (DMD) chip formed inside the light radiation unit 50 when the light radiation unit 50 built in the scanner radiates the light toward an outside of the scanner, and in this case, various patterns may appear.

Further, in the alignment state indicating method accord-ing to the present disclosure, the color (first color having a first wavelength range) of the light that is radiated from the light radiation unit in the light radiation step (S1) and the color (second color having a second wavelength range) of the light that is radiated from the light radiation unit in the feedback step (S7) may be configured to be different from each other. That is, the alignment error can be efficiently notified to the user who continuously keeps an eye on the patient's oral cavity. Exemplarily, the color of the light that is radiated in the light radiation step (S1) and the color of the light being radiated in the feedback step (S7) may be clearly distinguished from each other so that the user can immedi-ately perceive the alignment error. For example, the color of the light that is radiated in the light radiation step (S1) may be blue, and the color of the light that is radiated in the feedback step (S7) may be red. The color of the light may be changed by adjusting the wavelength of the light that is generated by the light source unit included in the light radiation unit or by combining light source elements in case that the light source unit includes a plurality of light source elements that can generate light having different wave-lengths.

Meanwhile, with reference to the alignment state indicat-ing apparatus according to the present disclosure as described above, the light in the first form in the light radiation step (S1) may have the first color having the first wavelength range together with the first pattern, and the light in the second form in the feedback step (S7) may have the second color having the second wavelength range together with the second pattern. As described above, since the light in the first form in the light radiation step (S1) and the light in the second form in the feedback step (S7) appear as the pattern and color changes, the user can easily perceive whether the alignment error has occurred.

Further, in the alignment state indicating method according to the present disclosure, the light in the form of various colors or patterns or combinations thereof may be radiated from the light radiation unit 50 to the inside of the patient's oral cavity as being varied at predetermined intervals in the scanning step (S2), and the light having one static color and pattern may be radiated in the feedback step (S7) in which the feedback is generated due to an occurrence of the alignment error. For example, in the scanning step (S2), the light radiation unit 50 may radiate variable colors or patterns onto the object in the order of a red light, a green light, a blue light, a blue light having the (1-1)-th pattern, a blue light having the (1-2)-th pattern, and a blue light having the (1-3)-th pattern. If the alignment error occurs during performing of the alignment process, the light can be successively radiated without blinking by a light source (e.g., light source having a red light or a green light) having a different color from the blue light in the feedback step (S7).

As one detailed embodiment, referring to FIG. 6, in the alignment state indicating method according to the present disclosure, the user may grip the handheld type oral scanner with the user's hand, and may scan the object T to be scanned. The scanner 1 may continuously receive an image of the raw data, and convert the raw data into the 3D data. Meanwhile, if the object T is unable to be sufficiently scanned during the scanning of the object T, a part in which connection between the 3D data becomes unclear may occur, and the part remains as a data blank B.

As described above, if the data blank B occurs, the scanned data after the data blank B occurs is unable to be connected and aligned with the scan data before the data blank B occurs. For example, if the user is unable to proceed with a careful scan at the middle point of the scan path while the scanner 1 performs the scanning in accordance with the scan direction as illustrated in FIG. 7, the data blank B may occur. For example, although the alignment between the 3D data may have been normally performed up to a first scan area SC1 by the user's scanning, the second scan area SC2 being scanned after the data blank B occurs does not have a clear data connection relationship with the first scan area SC1, and thus it may be difficult to proceed with any further additional scan. If the alignment error occurs as described above, the first pattern P1 that is radiated by the light radiation unit 50 may be changed to the second pattern P2, and thus the user can promptly and intuitively perceive the error occurrence through the second pattern P2 being displayed on the inside of the oral cavity that is the scan object. Meanwhile, with respect to the method for notifying of the alignment error through the radiation of the second pattern P2, various patterns, colors, or combinations thereof may be used as described above with respect to the operation of the light radiation unit 50 in the alignment state indicating apparatus as described above.

Hereinafter, the time when the light form is changed in the alignment state indicating method according to the present disclosure will be described as an example.

Figure 8:
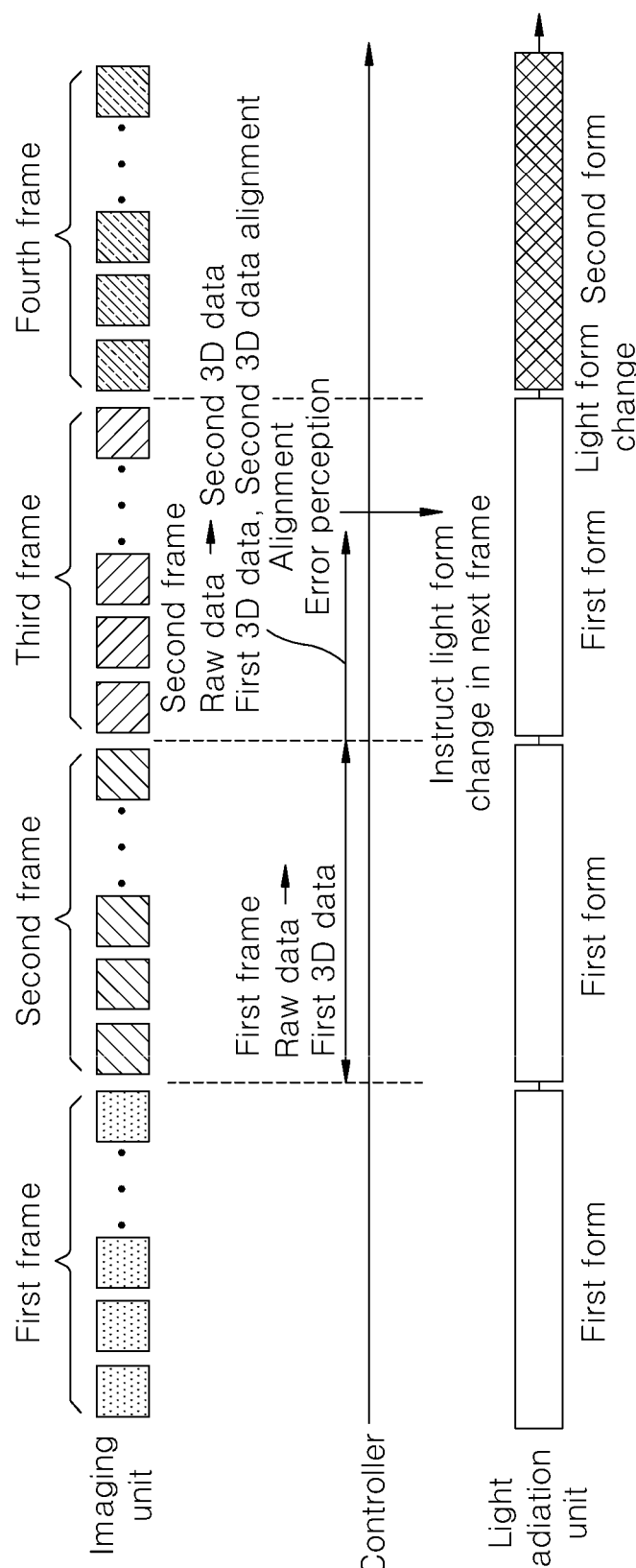
FIG. 8 is a diagram explaining in detail a method for indicating an alignment state.
Figure 9:
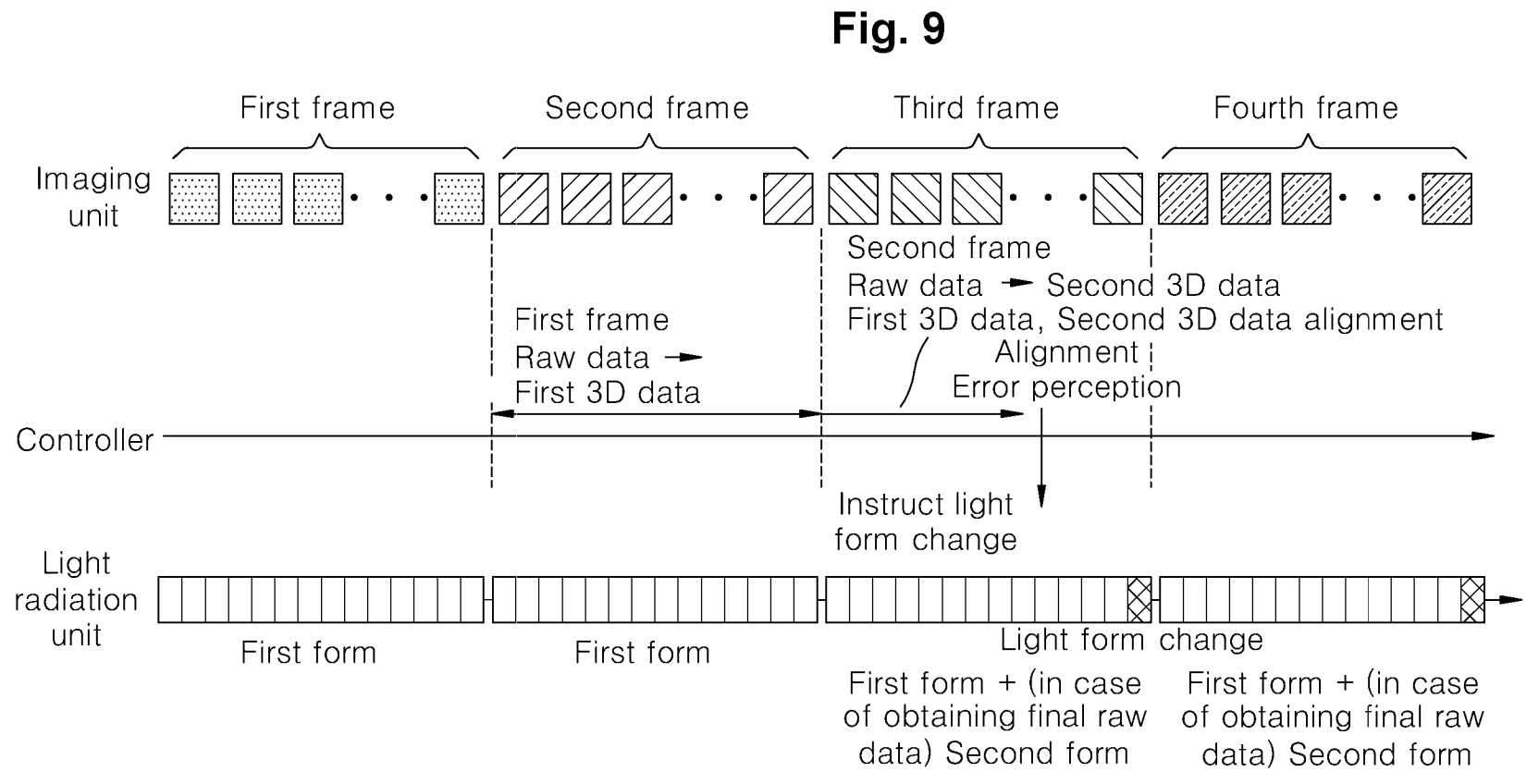

FIG. 8 is a diagram explaining in detail a method for indicating an alignment state, and FIG. 9 is a diagram explaining in detail another method for indicating an alignment state.

Referring to FIG. 8, a plurality of frames may exist. Each frame may obtain a plurality of raw data that become the basis of 3D data generation in the scanning step (S2). Exemplarily, in order to generate one 3D data, 14 raw data may be obtained by the imaging unit 20 of the scanner 1, and the 14 raw data may be considered as one set. That is, the above-described raw data obtaining step (S3) may obtain the plurality of raw data in the unit of a set.

The raw data obtained from the first frame may be converted into one 3D data (first 3D data) by the controller in the second frame. Further, in the second frame, the imaging unit 20 obtains the raw data for generating new 3D data (second 3D data). Then, the second 3D data may be generated in the third frame, and an alignment of the first 3D data and the second 3D data may be performed. In the first frame to the third frame, the light emitted from the scanner 1 may be the light in the first form. Exemplarily, the light in the first form, being emitted from the scanner 1 in the first to third frames may be sequential display of the red light, green light, blue light, blue light of the (1-1)-th pattern, blue light of the (1-2)-th pattern, and blue light of the (1-3)-th pattern.

In this case, if the alignment between the first 3D data and the second 3D data has failed, the feedback step (S7) may be performed, and in order to indicate the alignment error state for a predetermined time, the controller 70 may control the light radiation unit 50 to emit the light in the second form in a specific frame. Exemplarily, in the feedback step (S7), in accordance with the instructions of the controller 70, the light radiation unit 50 may emit the light in the second form in the fourth frame that follows the third frame. Exemplarily, the light in the second form that is emitted by the light radiation unit 50 in the fourth frame may be a successive display of the red light having a specific pattern. As another example, the light in the second form that is emitted by the light radiation unit 50 in the fourth frame may be the red light having the pattern in the form of an alphabet "X". The user can easily perceive the alignment error occurrence through the light in the second form.

If the frame in which the feedback step (S7) is performed is ended although the alignment error has occurred, the scanner 1 may obtain the raw data again in the subsequent frame. Exemplarily, if the fourth frame is ended, the fifth frame starts, the light in the first form may be emitted toward the object again, and the raw data may be obtained. Further, before and after the alignment error occurrence, the 3D data may be stored in different groups. As described above, through the alignment error indicating apparatus A according to the present disclosure, the 3D data stored in different groups may be aligned on the whole after the scanning process is ended, and thus the data blank B may be minimized.

Referring to FIG. 9, a plurality of frames may exist as illustrated in FIG. 8. However, according to another method for indicating the alignment state, in case that the alignment error of the first 3D data and the second 3D data occurs in the third frame, the light in the second form may be emitted toward the object through the light radiation unit 50 when the final raw data among the raw data obtained in the third frame is obtained.

Exemplarily, in case that the imaging unit 20 of the scanner 1 obtains 14 raw data in one frame, the light radiation unit 50 may emit the light in the second form toward the object when the $14^{th}$ raw data of the third frame is obtained in accordance with the instructions of the controller 70 in the feedback step (S7). In this case, the light in the second form may be emitted when the final raw data of at least one frame is obtained after the alignment error occurs. In case that the alignment error occurs, and the light radiation unit emits the light in the second form, the user can promptly perceive whether the alignment error has occurred. Meanwhile, before and after the alignment error occurrence, the 3D data may be stored in different groups, and through the alignment error indicating apparatus A according to the present disclosure, the 3D data stored in different groups may be aligned on the whole after the scanning process is ended, and thus the data blank B may be minimized.

Meanwhile, in the alignment state indicating method according to the present disclosure, a feedback method for indicating the alignment error state through different senses may be used in addition to the method for visually giving the feedback to the user as described above. That is, the alignment state indicating method according to the present disclosure may include an additional feedback step (not illustrated) of indicating the feedback (alignment error state) to the user by generating vibrations through the actuator 60 built in the scanner 1.

Any form of the actuator 60 is possible as long as the actuator 60 that performs the additional feedback step is formed to be built in the case of the scanner 1, and preferably, the actuator 60 may be formed adjacent to a part gripped by the user who scans the patient's oral cavity by using the scanner 1, that is, adjacent to the inside of the body case 11 described above. By disposing the actuator 60 inside the body case 11, a part of the tip case 14 enters into the oral cavity not to cause discomfort to the patient through unintended impact applied to the inside of the patient's oral cavity due to the vibrations during performing the scanning.

Further, in case that the handle 80 is included as an additional constituent element, the actuator 60 is built in the gripping part 82 of the handle 80, and the user can promptly and easily perceive whether the alignment error has occurred due to the vibrations of the actuator 60.

Meanwhile, if the controller 70 determines that the data connection and arrangement (alignment) between the obtained 3D data is not normally performed, the actuator 60 may operate to successively vibrate together with the light radiation in the second form of the light radiation unit 50. That is, if the alignment error occurs, the actuator 60 may operate to continuously vibrate, and the user can perceive that the alignment error has occurred in case that the vibration occurs on the scanner 1, and thus the user may perform an additional scanning with respect to the vibration-occurring part. If the controller 70 determines that the data connection and arrangement (alignment) between the 3D data is normally performed by the additional scanning, the actuator 60 may stop the vibration, and the user can obtain the data by stably performing the scanning of the patient's oral cavity. As described above, by providing the user with the feedback of whether the alignment error has occurred by using two or more senses (sight and touch), the user can promptly perceive whether the alignment error has occurred, and can obtain reliable data by performing the additional scanning of the corresponding part. If the alignment error is solved in the feedback step (S7) or in the additional feedback step (not illustrated), the existing steps performed before the alignment error occurrence, such as the light radiation in the first form, scanning, and alignment, may be re-performed (S8).

The above explanation of the present disclosure is merely for exemplary explanation of the technical idea of the present disclosure, and various changes and modifications may be possible in a range that does not deviate from the essential characteristics of the present disclosure by those of ordinary skill in the art to which the present disclosure pertains.

Accordingly, embodiments disclosed in the present disclosure are not to limit the technical idea of the present disclosure, but to explain the technical idea, and the scope of the technical idea of the present disclosure is not limited by such embodiments. The scope of the present disclosure should be interpreted by the appended claims, and all technical ideas in the equivalent range should be interpreted as being included in the scope of the present disclosure.

INDUSTRIAL APPLICABILITY

The present disclosure is to provide an alignment state indicating apparatus and an alignment state indicating method, in which a user who uses a scanner can intuitively perceive a state where connection and alignment between 3D data is not normally performed (alignment error).

The invention claimed is:

1. An alignment state indicating apparatus comprising:
   a case having an opening formed thereon and configured to be open so that an object in the form of light enters into the case;
   a light radiation unit disposed inside the case and configured to emit light in a first form having a predetermined rule through the opening;
   an imaging unit formed on one side of the light radiation unit and configured to obtain raw data by receiving incident light through the opening of the case; and
   a controller configured to determine whether an alignment error occurs by performing data alignment between 3D data generated through imaging by the imaging unit,
   wherein the controller is configured to perform visual feedback of an alignment state by controlling the light emitted from the light radiation unit to be changed to a second form that is different from the first form when the alignment error occurs,
   wherein the light radiation unit comprises a light source unit configured to generate the light, and a DMP chip having a plurality of micro-mirrors arranged in the form of an array.

2. The alignment state indicating apparatus of claim 1, wherein the first form is a first pattern having the predetermined rule, the second form is a second pattern that is different form the first pattern, and the first pattern and the second pattern are formed through an angle adjustment of the micro-mirrors.

3. The alignment state indicating apparatus of claim 2, wherein the first pattern comprises a first color having a first wavelength range, the second pattern comprises a second color having a second wavelength range, and the first color and the second color are formed through a wavelength adjustment of the light source unit.

4. The alignment state indicating apparatus of claim 2, wherein the first pattern is a varying pattern, and the second pattern is a static pattern.

5. The alignment state indicating apparatus of claim 4, wherein the second pattern is an X-shaped pattern.

6. The alignment state indicating apparatus of claim 1, wherein the first form includes a first color having a first wavelength range, the second form includes a second color having a second wavelength range, and the first color and the second color are formed through a wavelength adjustment of the light being generated by the light source unit.

7. The alignment state indicating apparatus of claim 6, wherein the wavelength adjustment of the light being generated by the light source unit is performed by a combination of a plurality of light source elements included in the light source unit and configured to emit lights of different wavelengths.

8. The alignment state indicating apparatus of claim 1, wherein the controller controls the light source unit or an angle of the plurality of micro-mirrors to control the form of the light emitted from the light radiation unit.

9. The alignment state indicating apparatus of claim 1, further comprising an actuator formed inside the case, wherein the controller is configured to perform additional feedback of the alignment state through vibrations by the actuator.

10. An alignment state indicating method comprising:
a light radiation step of emitting light in a first form having a predetermined rule, to scan an object through a scanner, by a light radiation unit built in the scanner;
a scanning step of scanning the object through the scanner;
a raw data obtaining step of obtaining raw data by an imaging unit formed on an inside of the scanner through a light incident to an inside of the scanner in the scanning step;
an alignment step of performing data connection and alignment between 3D data;
an alignment checking step of determining whether an alignment error occurs in the alignment step between the 3D data; and
a feedback step of indicating an alignment error state by emitting light in a second form that is different from the light in the first form by the light radiation unit when the alignment error occurs in the alignment checking step, wherein the light radiation unit comprises a light source unit configured to generate the light, and a DMP chip having a plurality of micro-mirrors arranged in the form of an array.

11. The alignment state indicating method of claim 10, wherein the first form is a first pattern having the predetermined rule, and the second form is a second pattern that is different from the first pattern.

12. The alignment state indicating method of claim 11, wherein the first pattern comprises a first color having a first wavelength range, and the second pattern comprises a second color having a second wavelength range.

13. The alignment state indicating method of claim 11, wherein the first pattern is a varying pattern, and the second pattern is a static pattern.

14. The alignment state indicating method of claim 10, wherein the first form includes a first color having a first wavelength range, and the second form includes a second color having a second wavelength range.

15. The alignment state indicating method of claim 10, wherein the raw data obtaining step obtains a plurality of the raw data in the unit of a frame, and
wherein the feedback step emits light in the second form in a specific frame to indicate the alignment error state for a specific time, and returns to the light radiation step in a subsequent frame.

16. The alignment state indicating method of claim 10, wherein the raw data obtaining step obtains a plurality of the raw data in the unit of a frame, and
wherein the feedback step emits the light in the second form when final raw data of a specific frame is obtained in order to indicate the alignment error state for a specific time.

17. The alignment state indicating method of claim 10, further comprising an additional feedback step of indicating the alignment error state through vibrations of an actuator formed on the inside of the scanner, the additional feedback step being performed simultaneously with the feedback step.

* * * * *